(12) United States Patent
Maeda et al.

(10) Patent No.: US 7,031,546 B2
(45) Date of Patent: Apr. 18, 2006

(54) NOISE REDUCTION METHOD, NOISE REDUCING APPARATUS, MEDIUM, MEDIUM AND PROGRAM

(75) Inventors: Tsuyoshi Maeda, Osaka (JP); Yoshio Seki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 688 days.

(21) Appl. No.: 10/129,887

(22) PCT Filed: Sep. 10, 2001

(86) PCT No.: PCT/JP01/07817

§ 371 (c)(1),
(2), (4) Date: Oct. 1, 2002

(87) PCT Pub. No.: WO02/23915

PCT Pub. Date: Mar. 21, 2002

(65) Prior Publication Data

US 2003/0107582 A1 Jun. 12, 2003

(30) Foreign Application Priority Data

Sep. 12, 2000 (JP) .............................. 2000-275996

(51) Int. Cl.
*G06K 9/40* (2006.01)
(52) U.S. Cl. ...................................... 382/260; 382/250
(58) Field of Classification Search ................ 382/268, 382/260, 261, 275, 254, 263, 266, 269, 276, 382/277, 250, 232, 239; 358/433, 426, 530, 358/465, 463; 348/607
See application file for complete search history.

(56) References Cited

U.S. PATENT DOCUMENTS

| | | | | |
|---|---|---|---|---|
| 5,819,035 A | * | 10/1998 | Devaney et al. | ............ 709/202 |
| 5,850,294 A | * | 12/1998 | Apostolopoulos et al. | .................... 358/426.14 |
| 6,636,645 B1 | * | 10/2003 | Yu et al. | ..................... 382/268 |
| 6,731,821 B1 | * | 5/2004 | Maurer et al. | .............. 382/263 |
| 2003/0206231 A1 | * | 11/2003 | Chen et al. | ............ 348/207.99 |

FOREIGN PATENT DOCUMENTS

| | | |
|---|---|---|
| JP | 08-065673 | 8/1996 |
| JP | 09-186993 | 7/1997 |
| JP | 09-187006 | 7/1997 |
| JP | 09-200759 | 7/1997 |
| JP | 11-112978 | 4/1999 |
| JP | 11-317943 | 11/1999 |

OTHER PUBLICATIONS

Japanese search report for PCT/JP01/07817 dated Dec. 25, 2001.
English translation of Form PCT/ISA/210.

* cited by examiner

*Primary Examiner*—Von J. Couso
(74) *Attorney, Agent, or Firm*—RatnerPrestia (57) ABSTRACT

A noise reduction apparatus in accordance with the present invention is configured to reduce mosquito noise while retaining edges by calculating the maximum value Y of the difference values of adjacent pixels in an area of M×N around a notice pixel by using a difference value calculator and a maximum value calculator, by controlling a pixel replacement device depending on Y and the difference value X from the notice pixel in the area of J×K narrower than the area of M×N, and by carrying out more intense smoothing depending on the magnitude of X with respect to Y, that is, when X is smaller than Y.

22 Claims, 9 Drawing Sheets

$$\frac{|XB|}{YB^n}$$

NOISE REDUCTION METHOD, NOISE REDUCING APPARATUS, MEDIUM, MEDIUM AND PROGRAM

THIS APPLICATION IS A U.S. NATIONAL PHASE APPLICATION OF PCT INTERNATIONAL APPLICATION PCT/JP01/07817.

1. Technical Field

The present invention relates to a noise reduction method, a noise reduction apparatus, a medium and a program applicable to digitally compressed decoded images, for example.

2. Background Art

In an image compression technology, such as MPEG, discrete cosine transform (DCT) is used generally. Noise referred to as mosquito noise occurs in the decoded signals of video signals compressed on the basis of DCT. This is because high-frequency components are quantized roughly when image compression is carried out, whereby parts of high-frequency components in blocks abundantly including high-frequency components are lost, and whereby information lost at the time of decoding cannot be decoded, and high-frequency distortion (ringing) occurs. Hence, if a ringing-like distortion occurs near image edges, particularly at the flat portions thereof, the distortion is detected as significant deterioration.

As a method of reducing such mosquito noise without changing image edges, a method disclosed in Japanese Laid-open Patent Application No. Hei 9-200759, for example, is available.

The entire disclosure of the above-mentioned publication is incorporated herein by reference in its entirety.

In this method, the gradient (for example, a difference value of image values of adjacent images in a predetermined area) of each DCT block is calculated, and anisotropic diffusion is controlled on the basis of it.

The anisotropic diffusion is a method wherein a threshold value is set, and changes not more than the threshold value are smoothened, whereby minute noise reduction is carried out. According to Japanese Laid-open Patent Application No. Hei 9-200759, a threshold value is set in each block depending on the gradient, whereby mosquito noise reduction is attained while edges are retained.

Figure 9:
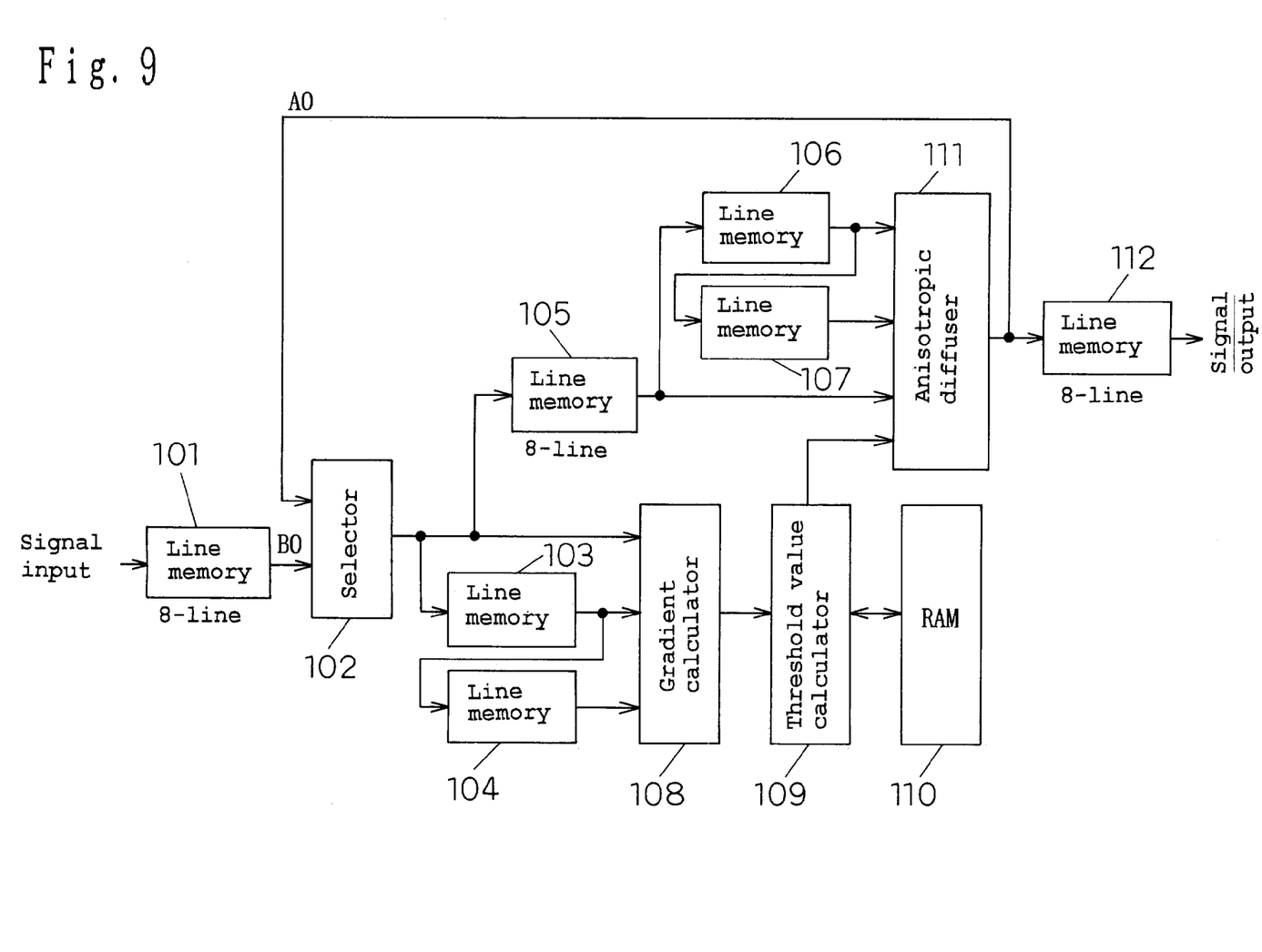
FIG. 9 is the block diagram showing the configuration of the conventional mosquito noise apparatus.

FIG. 9 is a block diagram showing a method using the above-mentioned anisotropic diffusion. Herein, luminance signal processing is taken as an example and explained. In FIG. 9, numerals 101, 105 and 112 designate 8-line line memory devices, numeral 102 designates a selector, numerals 103, 104, 106 and 107 designate 1-line line memory devices, numeral 108 designates a gradient calculator, numeral 109 designates a calculator for calculating a threshold value for controlling anisotropic diffusion depending on the threshold value, numeral 110 designates a random access memory device (RAM), which is referred to when the threshold value is calculated, and numeral 111 designates an anisotropic diffuser.

In this configuration, a video signal subjected to anisotropic diffusion is input to the selector 102 via a path A0. Hence, the selector 102 switches between the signal once subjected to anisotropic diffusion on the path A0 and a signal not subjected to anisotropic diffusion on a path B0, and a series of anisotropic diffusion processes are carried out twice as fast as the dot clock of the video signal, whereby the anisotropic diffusion is carried out twice.

A decoded signal is input as a video input to the 8-line line memory device 101, the output of the line memory device 101 and a signal processed by the anisotropic diffuser 111 are input to the selector 102, and selection is carried out and a signal is output.

The line memory device 101 is used for temporary signal storage when the switching between the path A0 after the anisotropic diffusion and the video signal input path B0 is carried out.

The signal selected by the selector 102 is input to the line memory device 103, and its output is further input to the line memory device 104. The three line signals of the selector 102, the line memory device 103 and the line memory device 104 are input to the gradient calculator 108.

The gradient calculator 108 calculates gradients by using the three line signals and outputs the maximum value of the gradients in the DCT block. The threshold calculator 109 calculates the threshold value by using the RAM 110 depending on the maximum value of the gradients in the DCT block, that is, the output of the gradient calculator 108.

The output of the selector 102 is input to the 8-line line memory device 105, and its output is input to the anisotropic diffuser 111. This 8-line line memory device 105 is provided for positional adjustment so that the threshold value calculated for the DCT block is used as the threshold value for the anisotropic diffusion of the same DCT block.

The line memory device 106 delays the output of the line memory device 105 by one line and outputs it. The line memory device 107 delays the output of the line memory device 106 by further one line.

From the three line signals of the outputs of the line memory device 105, the line memory device 106 and the line memory device 107, the anisotropic diffuser 111 carries out anisotropic diffusion in the DCT block by using the threshold value calculated by the threshold calculator 109.

The output of the anisotropic diffuser 111 is input to the selector 102 via the path A0 and the line memory device 112. The line memory device 112 is used as a temporary storage memory device and outputs only the signal subjected to anisotropic diffusion twice.

In the method of using anisotropic diffusion, only the adjacent pixels are used as pixels contributing to the diffusion. Furthermore, in order to set a conduction value for determining the degree of smoothing in stable conditions so that the effect of noise reduction is enhanced while retaining image edges, and in order to obtain a high effect, a plurality of attempts are necessary.

In the method disclosed in Japanese Laid-open Patent Application No. Hei 9-200759, depending on the difference value from the adjacent pixels, the degree of smoothing in the case when the difference value is small is changed greatly from that in the case when the difference value is large, whereby a high noise reduction effect is obtained by carrying out two attempts.

With this configuration, when the gradient is large in each DCT block, the threshold value is made larger and a high degree of smoothing is carried out. On the other hand, when the gradient is small, the threshold value is made smaller and a low degree of smoothing can be carried out.

As a result, in a block having small high-frequency components, the threshold value for anisotropic diffusion is made smaller, and a fine image is stored.

In addition, in a block having large high-frequency components, a large degree of smoothing is carried out, whereby mosquito noise reduction can be attained while retaining image edges.

However, in the method of reducing mosquito noise by using the information of the DCT blocks as described above, it is necessary to receive the positional information of the DCT blocks from a decoder, for example.

In the case of a decoder in a generally widespread DVD player or the like, however, only a decoded image signal is transmitted usually, but the positional information of the DCT blocks is not transmitted.

Hence, in the case when the positional information of the DCT blocks is not obtained, the above-mentioned conventional method has a problem of being unable to carry out noise reduction.

Furthermore, there is also a problem of being unable to carry out noise reduction for an image signal that is subjected to an expansion or compression process wherein no DCT blocks are retained.

Still further, in the method of using anisotropic diffusion, numerous multipliers are used, and attempts must be repeated a plurality of times to obtain an effect, thereby causing a problem of making hardware very complicated.

DISCLOSURE OF THE INVENTION

An object of the present invention is to provide a noise reduction method, a noise reduction apparatus, a medium and a program capable of reducing noise while retaining image edges without using information obtained at the time of compression, such as DCT blocks, and without requiring conventional complicated hardware.

One aspect of the present invention is a noise reduction method for the decoded signal of a digitally compressed image signal, comprising:

a gradient calculation step of obtaining a predetermined gradient in an area of vertical M×horizontal N pixels (M and N are positive integers) around a notice pixel, a difference value calculation step of calculating, in an area of vertical J×horizontal K pixels (J and K are positive integers satisfying the relationships of $J \leq M$ and $K \leq N$, respectively) around said notice pixel, (J×K−1) difference values between said notice pixel and pixels other than said notice pixel, a correction value calculation step of calculating correction values from said gradient obtained by said gradient calculation step and said (J×K−1) difference values obtained by said difference value calculation step, and an addition step of calculating a new notice pixel by adding said correction values to said notice pixel.

With this method, mosquito noise reduction can be carried out without using information obtained at the time of compression, such as DCT blocks, and without requiring complicated hardware.

Another aspect of the present invention is a noise reduction apparatus for the decoded signal of a digitally compressed image signal, comprising:

gradient calculation means of obtaining a predetermined gradient in an area of vertical M×horizontal N pixels (M and N are positive integers) around a notice pixel, difference value calculation means of calculating, in an area of vertical J×horizontal K pixels (J and K are positive integers satisfying the relationships of $J \leq M$ and $K \leq N$, respectively) around said notice pixel, (J×K−1) difference values between said notice pixel and pixels other than said notice pixel, correction value calculation means of calculating correction values from said gradient obtained by said gradient calculation means and said (J×K−1) difference values obtained by said difference value calculation means, and addition means of calculating a new notice pixel by adding said correction values to said notice pixel.

With this configuration, mosquito noise reduction can be carried out without using information obtained at the time of compression, such as DCT blocks, and without requiring complicated hardware.

Still another aspect of the present invention is a noise reduction apparatus for the decoded signal of a digitally compressed image signal, comprising:

gradient calculation means of obtaining a predetermined gradient in an area of vertical M×horizontal N pixels (M and N are positive integers) around a notice pixel, difference value calculation means of calculating, in an area of vertical J×horizontal K pixels (J and K are positive integers satisfying the relationships of J<=M and K<=N, respectively) around said notice pixel, (J×K−1) difference values between said notice pixel and pixels other than said notice pixel, filter coefficient calculation means of calculating filter coefficient from said gradient obtained by said gradient calculation means and said (J×K−1) difference values obtained by said difference value calculation means, and filtering means of carrying out filtering on the basis of said calculated filter coefficients.

With this configuration, mosquito noise reduction can be carried out without using information obtained at the time of compression, such as DCT blocks, and without requiring complicated hardware.

Yet still another aspect of the present invention is a medium holding a program and/or data for carrying out the operations of all or part of the steps of said noise reduction method by using a computer and being processable by the computer.

Still yet another aspect of the present invention is a medium holding a program and/or data for carrying out the functions of all or part of the means of said noise reduction apparatus by using a computer and being processable by the computer.

A further aspect of the present invention is a program for causing a computer to carry out all or part of said gradient calculation step, said difference value calculation step, said correction value calculation step and said addition step of said noise reduction apparatus.

A still further aspect of the present invention is a program for activating a computer as all or part of said gradient calculation means, said difference value calculation means, said correction value calculation means and said addition means of said noise reduction apparatus.

EXPLANATIONS OF NUMERALS 12, 32, 52, 72 difference calculators
13, 53 maximum calculators
14 pixel replacement device
35 correction value calculator
37, 77 format detector
39, 79 controller
54 adaptive filtering device
75 filter coefficient calculator
76 filtering device

BEST MODE FOR CARRYING OUT THE INVENTION

Embodiments of the present invention will be described below referring to the drawings.

In the following explanation, digitized data is used as an input video signal; "horizontal" represents the horizontal direction of a screen displayed as one frame; "vertical" represents the vertical direction of the screen displayed as one frame; and one line represents one horizontal scanning period.

(1) FIRST EMBODIMENT

Figure 1:
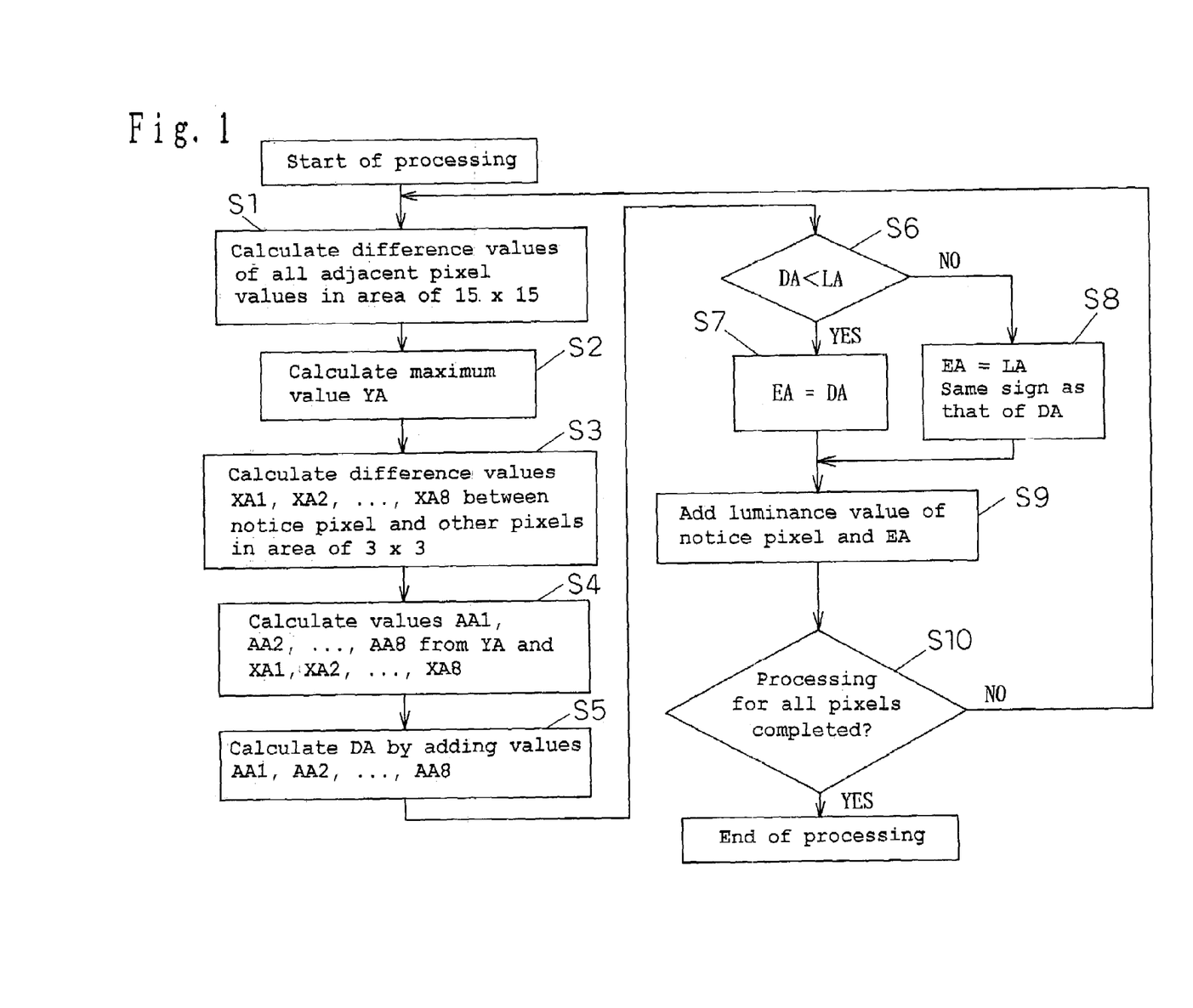
FIG. 1 is a flowchart showing a noise reduction method in accordance with a first embodiment of the present invention.

FIG. 1 is a flowchart illustrating a first embodiment of a noise reduction method in accordance with the present invention.

In this embodiment, an explanation is given with respect to an example wherein M and N for determining the range for obtaining the maximum value (corresponding to "the predetermined gradient" of the present invention) of the difference values among pixels around a notice pixel are 15, and J and K for determining a pixel range for obtaining new pixel values are 3, furthermore a luminance signal is used as a video signal input.

First, at step S1, the difference values of the luminance values among the adjacent pixels in the whole area of 15×15 pixels around the notice pixel are calculated.

At step S2, the maximum value YA of the absolute values of the difference values among the adjacent pixels in the area of 15×15 pixels, calculated at step S1, is calculated.

At step S3, the difference values between the luminance value of the notice pixel and the luminance values of the other pixels in the area of 3×3 around the notice pixel are calculated. The difference values are assumed to be XA1, XA2, ..., XA8. The signs of XA1, XA2, ..., XA8 are assumed to be positive when the luminance value of the notice pixel is larger than or equal to the luminance values of the pixels other than the notice pixel, and assumed to be negative when the luminance value is smaller.

At step S4, correction values AAk (k=1, 2, ..., 8) are obtained by using YA calculated at step S2 and XAk (k=1, 2, ..., 8) calculated at step S3. In other words, correction values AA1, AA2, ..., AA8, wherein there are correspondences such that-the value AA1 is calculated from YA and XA1, the value AA2 is calculated from YA and XA2, and so on, are obtained. The actual method of obtaining the correction values will be described later (see FIG. 2).

Next, at step S5, the correction values AA1, AA2, ..., AA8 obtained at step S4 are added, and the result is assumed to be DA.

At step S6, the absolute value of DA is compared with a set value LA; when the absolute value of DA is smaller than the set value LA, the sequence advances to step S7, and the value of DA is used as an addition value EA. When the absolute value is equal to or larger than the set value LA, the sequence advances to step S8, and the set value LA is used as the addition value EA while the sign of the set value LA is made identical to that of DA.

The set value LA will be described later.

At step S9, the luminance value of the notice pixel is added to EA obtained at step S7 or S8, whereby a new notice pixel is obtained and output in place of the notice pixel.

At step 10, a judgment as to whether the processing for pixels to be subjected to pixel replacement is completed or not; if the processing is not completed, the sequence from step S1 to step S9 is repeated while the pixel not subjected to the processing is used as the notice pixel.

If the processing is completed, the processing ends.

The gradient calculation step of the present invention corresponds to steps S1 to S2. In addition, the difference value calculation step of the present invention corresponds to step S3. Furthermore, the correction value calculation step of the present invention corresponds to steps S4 to S8. Still further, the addition step of the present invention corresponds to step S9.

Herein, as mentioned above, the method of obtaining the correction values will be described below.

In other words, for example, when the absolute values of XA1, XA2, ..., XA8 are smaller than YA in the above-mentioned configuration, the correction values AA1, AA2, ..., AA8 are set so that the luminance value of the notice pixel is close to the luminance values of the adjacent pixels. Hence, the minute changes near edges can be made smooth.

In addition, when the values of XA1, XA2, ..., XA8 are close to YA, the correction values AA1, AA2, ..., AA8 are set at small values. The reason why the correction values are herein set at small values will be described further later.

Furthermore, EA is limited by using the set value LA, whereby mosquito noise reduction can be attained while retaining edges.

Figure 2:
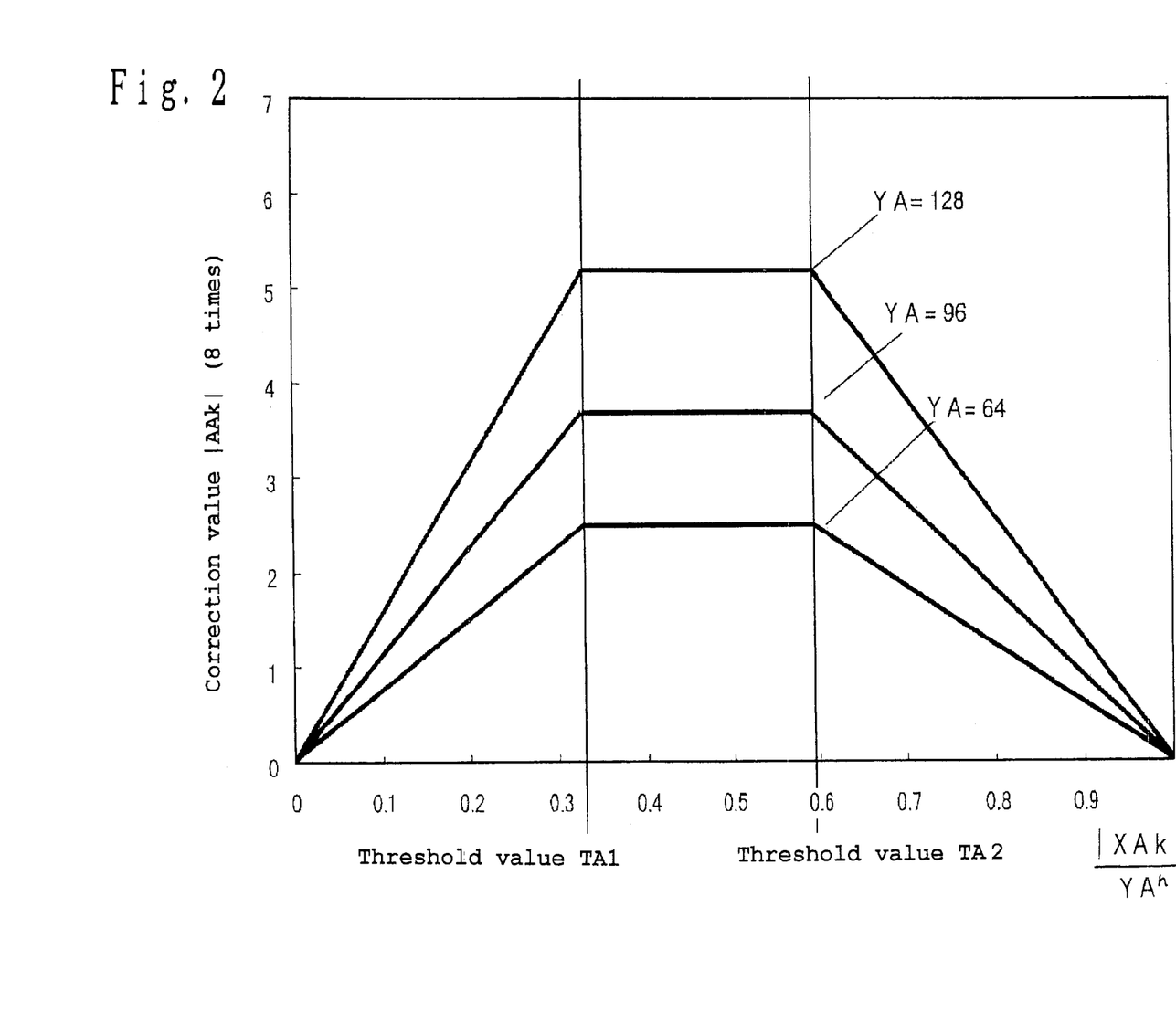
FIG. 2 is a view showing a graph for illustrating calculation examples of the absolute value of a correction value AA.

The above-mentioned matters will be described as follows referring to FIG. 2. Herein, FIG. 2 is a graph illustrating the method of calculating the absolute values of the correction values. As shown in the figure, a graph for the calculation of the correction values is determined beforehand for each of the maximum values of the difference values; however, all the graphs have a similar characteristic.

As shown in FIG. 2, for example, setting is done beforehand so that the absolute value of the correction value AA1 (when k=1) becomes larger as an evaluation value (the value corresponding to the abscissa of FIG. 2) obtained from the equation defined by (Equation 1) becomes larger up to a threshold value TA1, and so that the absolute value becomes smaller as the above-mentioned evaluation value becomes larger than a threshold value TA2. Herein, the signs of AA1, AA2, ..., AA8 correspond to those of XA1, XA2, ..., XA8, respectively. In (Equation 1), AA1, AA2, ..., AA8 are represented by AAk (k=1, 2, ..., 8), and XA1, XA2, ..., XA8 are represented by XAk (k=1, 2, ..., 8).

The method of obtaining the above-mentioned correction values will be described further with respect to its effect.

When the above-mentioned evaluation value is smaller than the threshold value TA1 (about 0.3), an edge portion existing in the area of 15×15 pixels is outside the area of 3×3 pixels. Hence, in this case, as described above, the correction value is determined so that the luminance value of the notice pixel in the area of 3×3 pixels becomes close to the luminance values of the adjacent pixels, whereby smoothing can be carried out securely in areas other than the area including the edge.

On the other hand, when the above-mentioned evaluation value exceeds the threshold value TA2 (in other words, when the difference value XAk is close to the maximum value YA), it is highly possible that an edge portion existing in the area of 15×15 pixels is inside the area of 3×3 pixels. Hence, in this case, it is supposed that the edge can be retained essentially by not correcting the notice pixel. In actual practice, however, when the above-mentioned evaluation value exceeds the threshold value TA1, if the correction value is set abruptly at 0, the correction value is changed abruptly, thereby causing new noise on the contrary.

For this reason, in the present invention, the correction value is not set abruptly at 0 even when the above-mentioned evaluation value exceeds the above-mentioned threshold value TA1, but the correction value is set so as to be retained at the same value in the range between the threshold values TA1 to TA2 and so as to become gradually close to 0 as the evaluation value exceeds the threshold value TA2 as shown in FIG. 2.

In this way, no new noise occurs, whereby mosquito noise can be reduced securely while retaining edges.

$$\frac{|XAk|}{(YAk)^n} \quad 1 \leq n \leq 2, \quad k = 1, 2, \cdots, 8 \quad \text{(Equation 1)}$$

In the present invention, the processing is carried out around the notice pixel; therefore, the method of replacing pixels is attained by a simple configuration comprising only an adder, regardless of the information at the time of compression, such as DCT blocks.

When 8-bit data, that is, 256-level data, is used, the set value LA is preferably 2 or more and 16 or less, and further preferably 4 or more and 8 or less.

The set value LA determines the maximum value of the absolute values of the correction values with respect to the notice pixel. By increasing this value, the correction values can be calculated in accordance with the calculations at steps S1 to S5. However, the maximum value of the correction values required for noise reduction is not larger than the values calculated at step S1 to step S5 in some cases. Setting a correction value larger than a necessary value is meaningless and exerts an influence of reducing the effect of edge retaining. Hence, by setting LA at an appropriate value, it is possible to obtain an effect of preventing this problem.

In addition, the calculations of obtaining AA1, AA2, ..., AA8 from YA and XA1, XA2, ..., XA8 may be the same calculations, respectively, for example; furthermore, the calculations may be different in the horizontal, vertical and slanting directions from the notice pixel; still further, calculations wherein values become larger relatively as the distance is closer depending on the distance from the notice pixel may also be used; besides, the calculations are not limited to these.

Furthermore, in this embodiment, an example wherein the maximum value of the absolute values of the difference values of the luminance values among the adjacent pixels is used as the predetermined gradient of the present invention is described; however, the gradient is not limited to this. The above-mentioned predetermined gradient may be the second largest value in the absolute values of the difference values of the luminance values among the adjacent pixels, for example; or a plurality of values may be selected in the decreasing order of the absolute values of the difference values of the luminance values among the adjacent pixels, beginning from the maximum value, and the average value of the values may be obtained, but the gradient is not limited to this.

Still further, in this embodiment, an example wherein the luminance signal is used as the video signal input is described; however, the input signal is not limited to this; for example, a color difference signal may be used as the input signal; furthermore, the luminance signal may be used at step S1 and step S2, and the color difference signal at the same position may be used at step S3 to step S11; however, the input signal is not limited to these.

Moreover, examples wherein M and N are 15, and J and K are 3 are described; however, their values are not limited to these.

(2) SECOND EMBODIMENT

Figure 3:
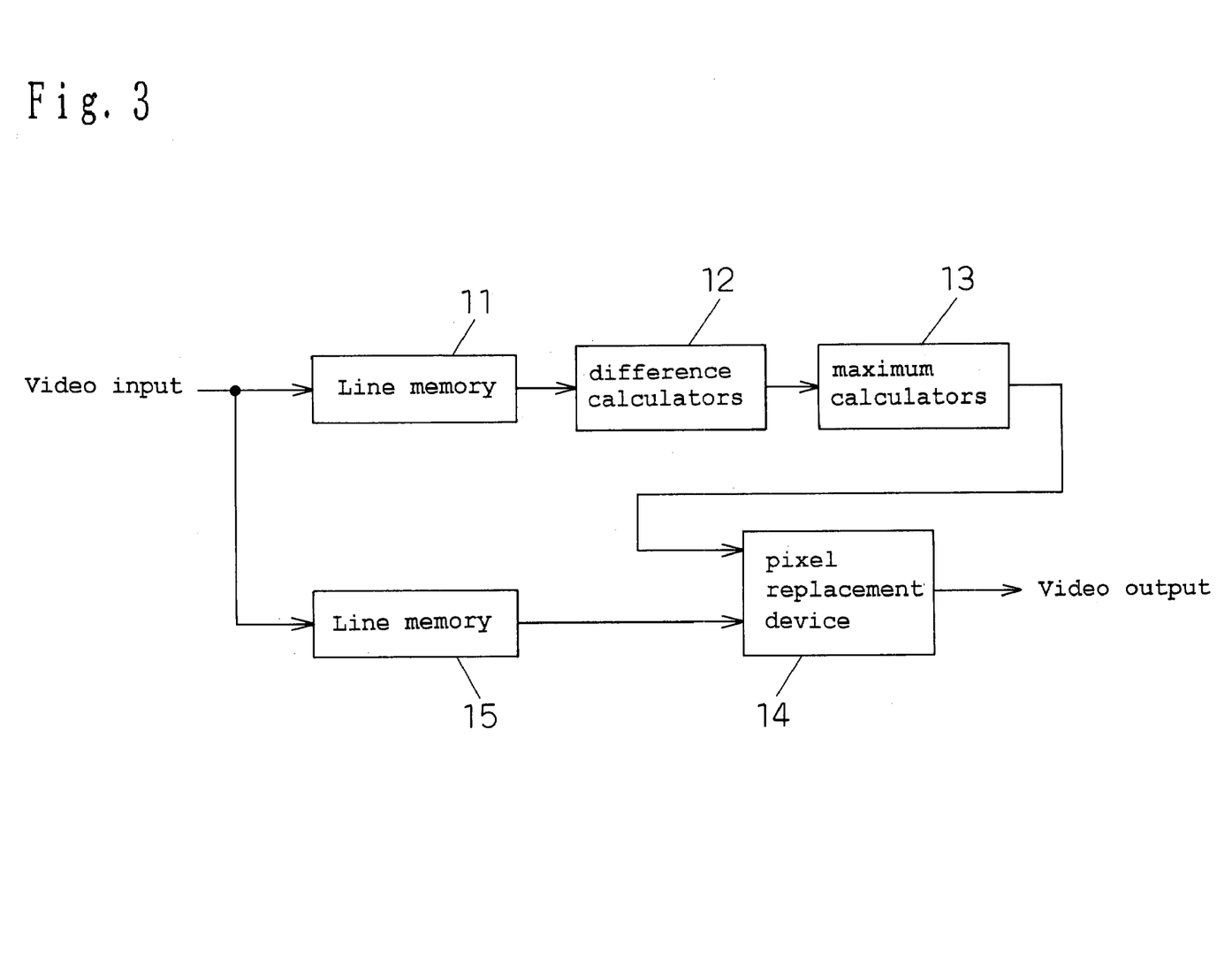
FIG. 3 is a block diagram showing the configuration of a noise reduction apparatus in accordance with a second embodiment of the present invention.

FIG. 3 is a block diagram showing the configuration of a mosquito noise reduction apparatus in accordance with an embodiment of the noise reduction apparatus of the present invention.

In this embodiment, an explanation is given with respect to an example wherein M and N for determining the range for obtaining the maximum of the difference value among pixels around a notice pixel are 15, and J and K for determining a pixel range for obtaining new pixel values to be replaced are 3, furthermore, a luminance signal is used as the video signal input.

In FIG. 3, numeral 11 designates a line memory device for delaying an input signal by 14 lines, numeral 12 designates a difference value calculator for calculating differences among the horizontal and vertical adjacent pixels in a predetermined area, numeral 13 designates a maximum value calculator, numeral 14 designates a pixel replacement device, and numeral 15 designates a line memory device for delaying the input signal by eight lines. In the mosquito noise reduction apparatus configured as described above, its operation will be described below.

A decoded signal is input as a video input to the line memory device 11 and the line memory device 15. The line memory device 11 delays the input video signal by 14 lines and outputs 15 line signals in total including the input signal to the difference value calculator 12. To the image replacement device 14, the line memory device 15 outputs three line signals centered at a line delayed by seven lines with respect to the input signal.

The difference value calculator 12 receives 15 line signals from the line memory device 11, uses a pixel delayed by seven lines with respect to the input video signal and delayed by seven pixels with respect to the input of the difference value calculator 12 as a notice pixel, calculates the difference values among the adjacent pixels in the horizontal and vertical directions in all the pixels in the area of 15×15 pixels around the notice pixel, and outputs all the difference values to the maximum value calculator 13.

The maximum value calculator 13 obtains the maximum value of the absolute values of the difference values in the area of 15×15 from the difference values among the adjacent pixels, which are output from the difference value calculator 12, and outputs it to the pixel replacement device 14.

By using signals in the area of 3×3 pixels around the notice pixel and on the basis of the output of the maximum value calculator 13 around the notice pixel determined by the difference value calculator 12, the pixel replacement device 14 calculates a new notice pixel for the signals delayed by six lines, seven lines and eight lines with respect to the input video signal, that is, the output of the line memory device 15, and outputs the new notice pixel in place of the notice pixel.

This pixel replacement device 14 will be described in detail referring to FIG. 4.

Figure 4:
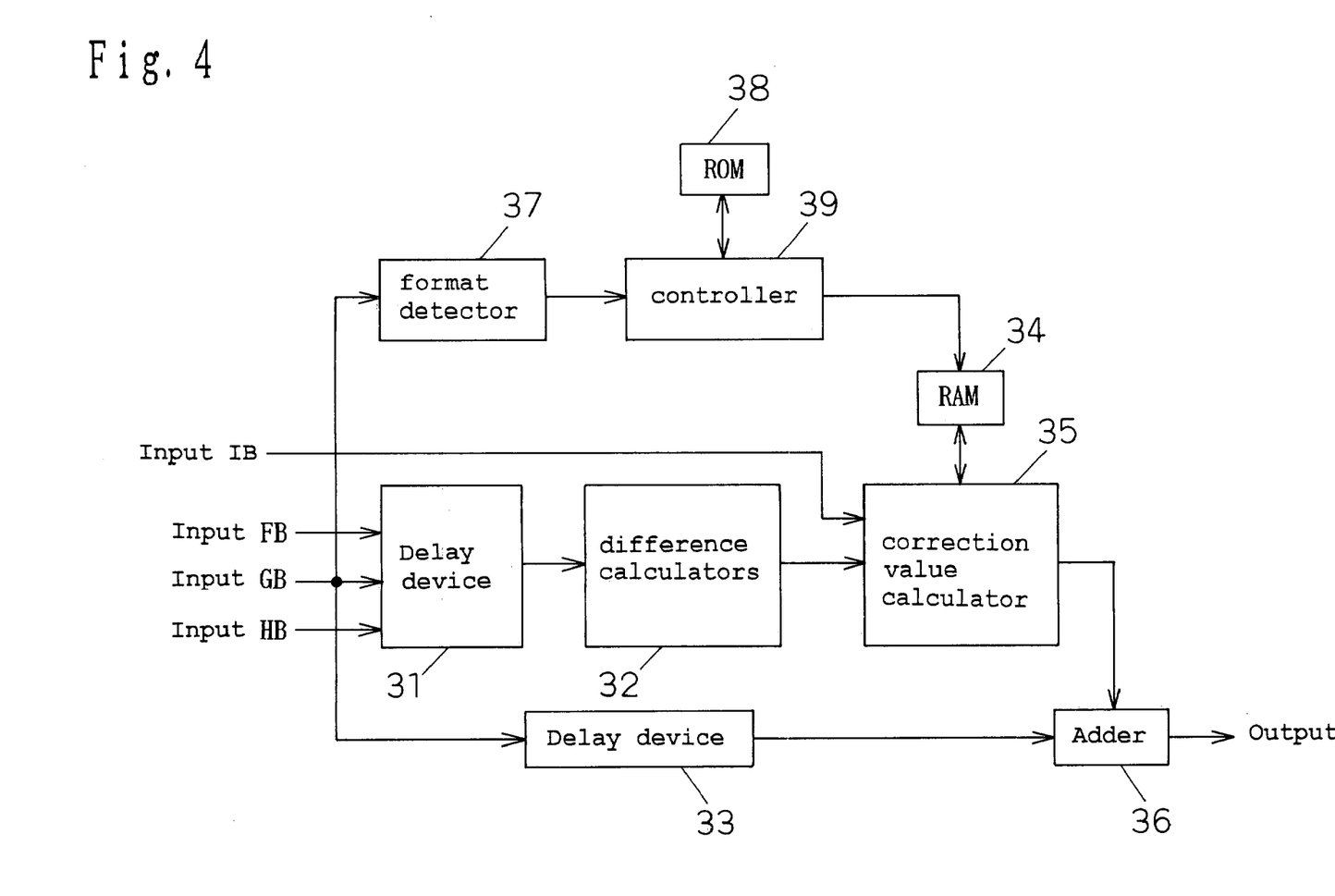
FIG. 4 is a block diagram showing an example of the configuration of a pixel replacement device shown in FIG. 3.

FIG. 4 is a block diagram showing a configuration example of the pixel replacement device. In FIG. 4, numerals 31 and 33 designate delay devices, numeral 32 designates a difference value calculator, numeral 34 designates RAM used as a lookup table for calculating correction values, numeral 35 designates a correction value calculator, numeral 36 designates an adder, numeral 37 designates a format detector, numeral 39 designates a controller for rewriting the content of the RAM 34 in accordance with the result of format detection, numeral 38 designates read-only memory (ROM) referenced by the controller 39.

The correction value calculation means of the present invention corresponds to the correction value calculator 35 and the like, and the addition means of the present invention corresponds to the adder 36.

Input signals FB, GB and HB shown in FIG. 4 are signals delayed by six lines, seven lines and eight lines, respectively, with respect to the video signal input shown in FIG. 3 among the output signals of the line memory device 15. In addition, an input signal IB corresponds to the output from the maximum value calculator 13 of FIG. 3.

In the pixel replacement device configured as described above, its operation will be described below.

The three line signals of the inputs FB, GB and HB are input simultaneously to the delay device 31. From the delay device 31, nine signals, that is, a no-delay signal, a one-pixel delay signal and a two-pixel delay signal formed for each of the three line signals, are output. These correspond to the nine pixels in the area of 3×3, and its center, that is, the output signal obtained by delaying the input signal from the input GB by delay device 31, corresponds to the notice pixel.

The output from the delay device 31 is input to the difference value calculator 32, and the difference value calculator 32 calculates the difference values between the notice pixel and the eight outputs of the delay device 31 other than the notice pixel, and outputs them. The outputs of the difference value calculator 32 and the input IB are input to the correction value calculator 35. The correction value calculator 35 calculates eight correction values by using the RAM 34 depending on the magnitudes of the input IB and the eight difference values calculated by the difference value calculator 32, and these are added.

When the absolute value of the result of the addition is larger than a set value LB, the value of the set value LB, the sign of which is the same as that of the result of the addition, is output; when the absolute value is smaller than the set value LB, the result of the addition is output.

The input GB is input to the delay device 33 having the same delay as the total delay required for the difference value calculator 32 and the correction value calculator 35, and its output is added to the notice pixel and the output of the correction value calculator 35 by the adder 36, whereby the notice pixel is replaced with the new notice pixel.

Furthermore, correction value data to be stored in the ROM 38 is selected by the controller 39 depending on the video format detected by the format detector 37. Then, other correction value data in the RAM 34 is rewritten by the selected new correction value data, whereby it is possible to have a correction value best suited for each format. For example, when the input signal is a video signal, real-time operation can be carried out by transferring data stored in the ROM 38 to the RAM 34 in a vertical retrace period.

With this configuration, for example, when the difference values in the area of 3×3 pixels are smaller than the maximum value of the difference values in the area of 15×15 pixels around the notice pixel, setting is done so as to output correction values so that the pixel value of the notice pixel becomes close to the pixel values of the adjacent pixels, and the notice pixel is replaced with the new notice pixel, whereby the minute changes near the edges can be made smooth.

Furthermore, when the difference values in the area of 3×3 pixels are larger, small correction values are set, and the correction values are limited by using the set value LB, whereby mosquito noise reduction can be attained while retaining the edges.

Still further, in order to carry out processing around the notice pixel, only the adder is used for the calculation of the pixel replacement device, regardless of the information at the time of compression, such as DCT blocks, whereby the hardware can be configured simply.

When 8-bit data, that is, 256-level data, is used, the set value L is preferably 2 or more and 16 or less, and further preferably 4 or more and 8 or less.

Figure 5:
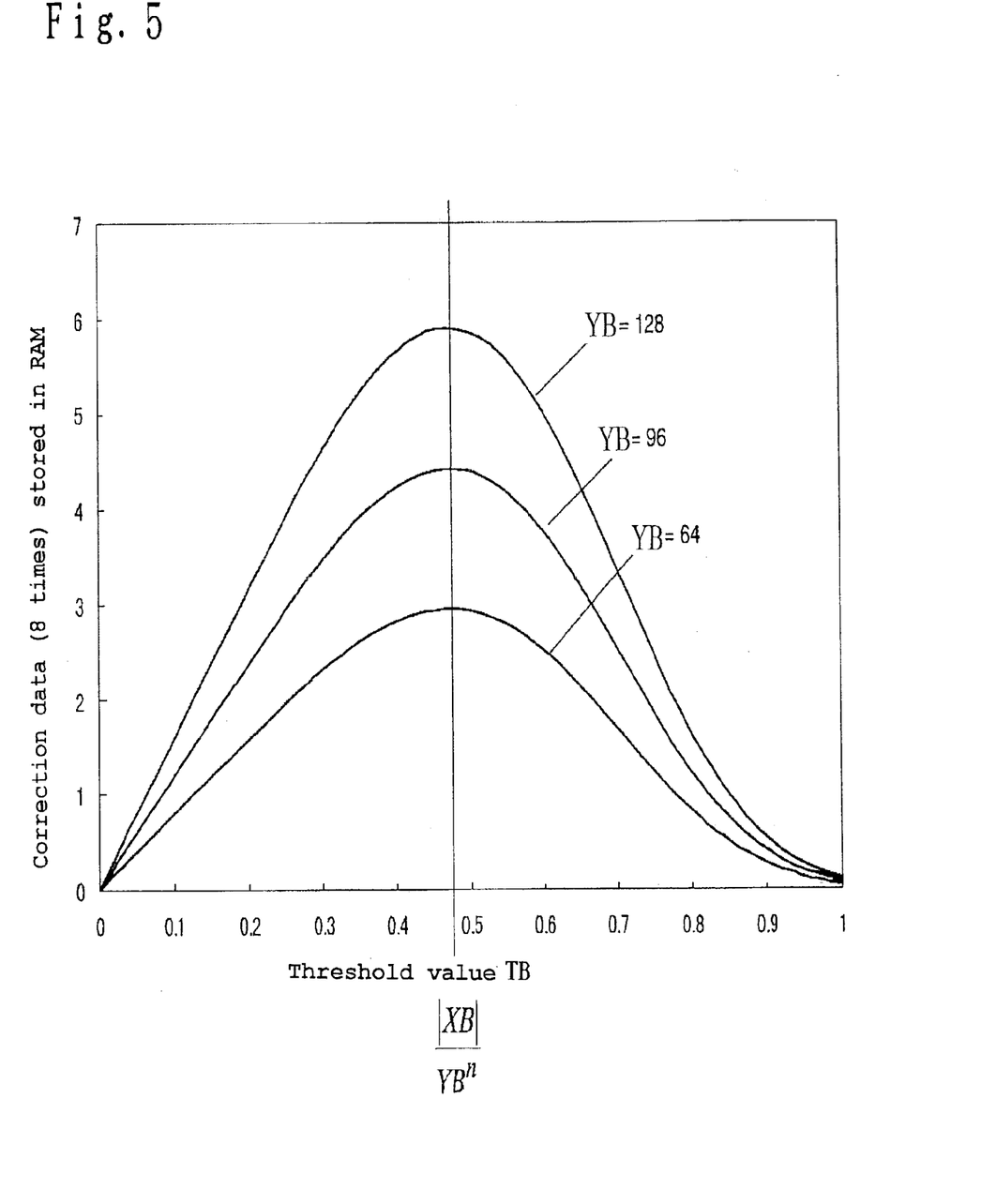
FIG. 5 is a view showing a graph for illustrating examples of data stored in RAM shown in FIG. 3.

When the maximum value of the difference values in an area of M×N is assumed to be YB and the typical value of the difference values between the notice pixel and pixels other than the notice pixel in an area of J×K is assumed to be XB, it is desirable that the correction value to be set in the RAM 34 becomes larger as the value of (Equation 2) becomes larger up to a threshold value TB, and that the correction value becomes smaller as the value of (Equation 2) exceeds the threshold value TB.

Moreover, it is further desirable that the correction value to be set in the RAM 34 is calculated from the following (Equation 3), and it is further desirable that n in (Equation 3) is 1.2 or more and 1.3 or less.

$$\frac{|XB|}{YB^n} \quad 1 \leq n \leq 2 \qquad \text{(Equation 2)}$$

$$\exp\left[-A \cdot \left(\frac{|XB|}{YB^n}\right)^\gamma\right] \cdot X \cdot S \quad \begin{array}{l} A > 0 \\ 2 \leq \gamma \leq 8 \quad 0 < S \leq \frac{1}{(J \times K) - 1} \\ 1 \leq n \leq 2 \end{array} \qquad \text{(Equation 3)}$$

All the data to be set in the RAM may have the same values, for example; the values may be different in the horizontal, vertical and slanting directions from the notice pixel; and the values may be different depending on the distance from the notice pixel; besides, the values are not limited to these.

In addition, in this embodiment, the line memory device 11 and the line memory device 15 are indicated independently; however, these may be united, whereby 15 line signals may be output to the difference value calculator 12 and three line signals may be output to the pixel replacement device 14.

Furthermore, an example wherein the luminance signal is used as the video signal input is described; however, a color difference signal may be used as the input signal, the luminance signal may be used as the input of the line memory device 11, and the color difference signal at the same position of the luminance signal may be used as the input of the line memory device 15; however, the input signals are not limited to these.

Moreover, examples wherein M and N are 15, and J and K are 3 are described; however, their values are not limited to these.

Furthermore, the controller 39 is explained by taking the configuration for carrying out control depending on the result of the format detector 37 as an example; however, for example, the controller may be configured so as to carrying out control depending on the noise level of the input video; but the configurations are not limited to these.

Furthermore, in this embodiment, an example wherein the maximum value of the absolute values of the difference values of the luminance values among the adjacent pixels is used as the predetermined gradient of the present invention is described; however, the gradient is not limited to this. The above-mentioned predetermined gradient may be the second largest value in the absolute values of the difference values of the luminance values among the adjacent pixels, for example; or a plurality of values may be selected in the decreasing order of the absolute values of the difference values of the luminance values among the adjacent pixels, beginning from the maximum value, and the average value of the values may be obtained, but the gradient is not limited to this.

Moreover, in this embodiment, the case wherein the set value LA is fixed is explained; however, for example, the set value may be controlled depending on the noise level of the input video signal, but the set value is not limited to this.

(3) THIRD EMBODIMENT

Figure 6:
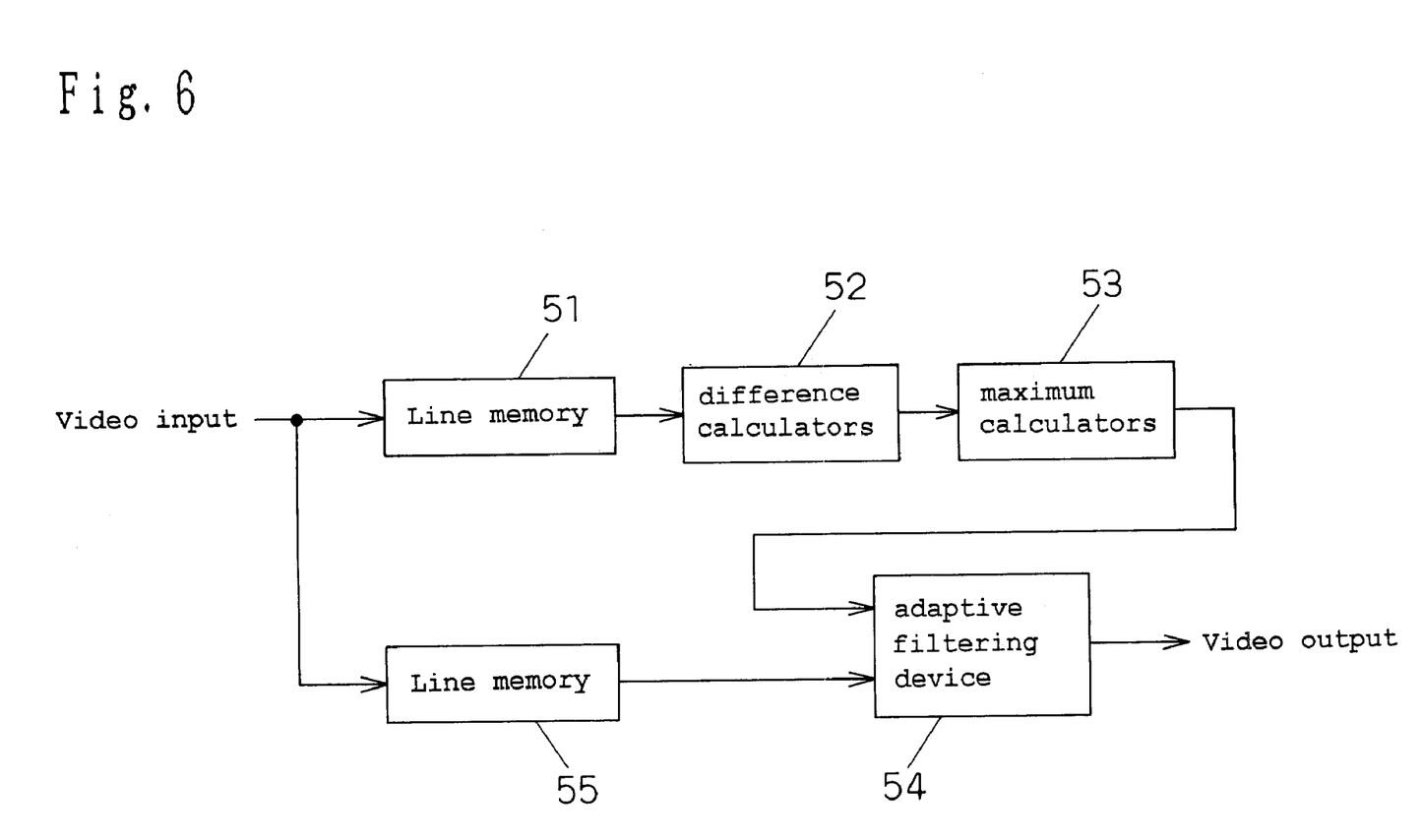
FIG. 6 is a block diagram showing the configuration of a noise reduction apparatus in accordance with a third embodiment of the present invention.

FIG. 6 is a block diagram showing the configuration of a mosquito noise reduction apparatus in accordance with an embodiment of the noise reduction apparatus of the present invention.

In this embodiment, an explanation is given with respect to an example wherein M and N are 15, J is 3, K is 5, and a luminance signal is used as the video signal input.

In FIG. 6, numeral 51 designates a line memory device for delaying an input signal by 14 lines, numeral 52 designates a difference value calculator for calculating differences among the horizontal and vertical adjacent pixels in a predetermined area, numeral 53 designates a maximum value calculator, numeral 54 designates an adaptive filtering device, and numeral 55 designates a line memory device for delaying the input signal by eight lines.

In the mosquito noise reduction apparatus configured as described above, its operation will be described below.

A decoded signal is input as a video input to the line memory device 51 and the line memory device 55. The line memory device 51 delays the input video signal by 14 lines and outputs 15 line signals in total including the input signal to the difference value calculator 52. To the adaptive filtering device, the line memory device 55 outputs three line signals centered at a line delayed by seven lines with respect to the input signal.

The difference value calculator 52 receives 15 line signals from the line memory device 51, uses a pixel delayed by seven lines with respect to the input video signal and delayed by seven pixels with respect to the input of the difference value calculator 52 as a notice pixel, and outputs the difference values among the adjacent pixels in the horizontal and vertical directions in all the pixels in the area of 15×15 pixels around the notice pixel to the maximum value calculator 53.

The maximum value calculator 53 obtains the maximum value of the absolute values of the difference values in the area of 15×15 from the difference values among the adjacent pixels, which are output from the difference value calculator 52, and outputs it to the adaptive filtering device 54.

On the basis of signals in the area of 3×5 pixels around the notice pixel and the output of the maximum value calculator 53, the adaptive filtering device 54 carries out adaptive filtering for the signals delayed by six lines, seven lines and eight lines with respect to the input video signal, that is, the output of the line memory device 55.

Figure 7:
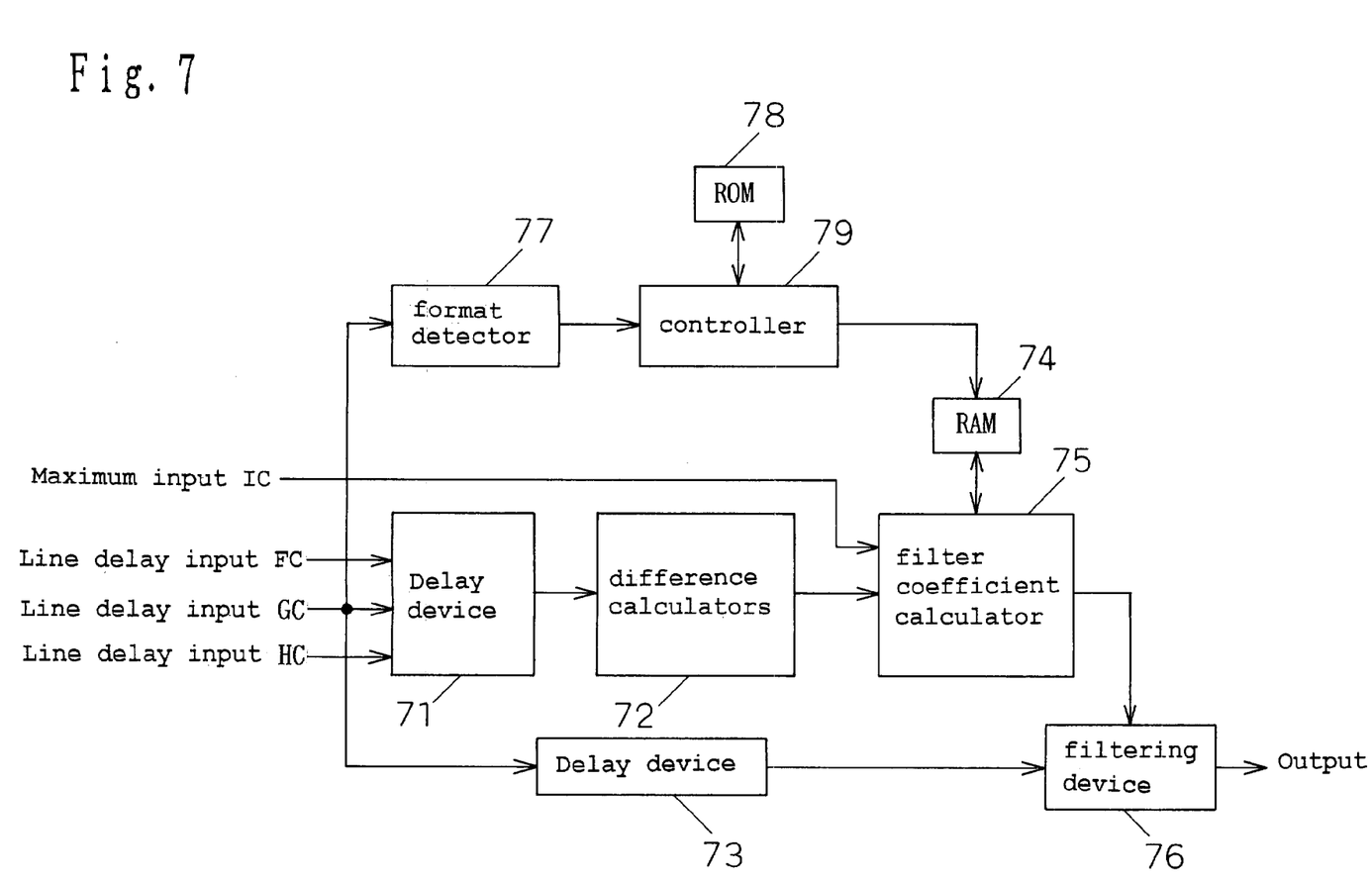
FIG. 7 is a block diagram showing an example of the configuration of an adaptive filtering device shown in FIG. 6.

This adaptive filtering device 54 will be described below in detail.

FIG. 7 is a block diagram of the adaptive filtering device 54. In FIG. 7, numerals 71 and 73 designate delay devices, numeral 72 designates a difference value calculator, numeral 74 designates RAM used as a lookup table for calculating filter coefficients, numeral 75 designates a filter coefficient calculator, numeral 76 designates a filtering apparatus, numeral 77 designates a format detector, numeral 79 designates a controller for rewriting the content of the RAM 74 in accordance with the result of format detection, numeral 78 designates ROM referenced by the controller 79.

Input signals FC, GC and HC shown in FIG. 7 are signals delayed by six lines, seven lines and eight lines, respectively, with respect to the video signal input shown in FIG. 6 among the output signals of the line memory device 51. In addition, an input signal IC corresponds to the output from the maximum value calculator 53 of FIG. 6.

In the adaptive filtering device configured as described above, its operation will be described below.

The three line signals of the input signals FC, GC and HC are input simultaneously to the delay device 71. From the delay device 71, 15 signals, that is, a no-delay signal, a one-pixel delay signal, a two-pixel delay signal, a three-pixel delay signal and a four-pixel delay signal formed for each of the three line signals, are output. These correspond to the 15 pixels in the area of 3×5, and its center corresponds to the notice pixel.

The output from the delay device 71 is input to the difference value calculator 72, and the difference value calculator 72 calculates the difference values between the notice pixel and the 14 outputs of the delay device 71 other than the notice pixel, and outputs them.

The outputs of the difference value calculator 72 and the input IC are input to the filter coefficient calculator 75. The filter coefficient calculator 75 reads the values of the RAM 74 corresponding to the 14 difference values calculated by difference value calculator 72, thereby calculating 14 filter coefficient candidates.

These 14 filter coefficient candidates correspond to the filter coefficients of the 14 pixels other than the notice pixel, respectively.

In addition, the filter coefficient candidates are classified depending on the distance from the notice pixel; for example, the filter coefficients in areas other than the area of 3×3 around the notice pixel are re-calculated so as to be not more than all the coefficient values in the area of 3×3 around the notice pixel, and become filter coefficients corresponding to the 14 pixels, respectively; furthermore, the filter coefficient of the notice pixel is calculated so that one is obtained when the coefficient is added to all the filter coefficients of the 14 pixels and that of the notice pixcel, and the filter coefficients corresponding to the 15 pixels are output to the filtering device 76.

An input E2 is input to the delay device 73 having the same delay as the total delay required for the difference value calculator 72 and the filter coefficient calculator 75, and its output is filtered by the filtering device 76 by using the filter coefficients of the 15 pixels, that is, the outputs of the filter coefficient calculator 75, and then output.

Furthermore, data to be stored in the ROM 78 is selected by the controller 79 depending on the video format detected by the format detector 77, and the data in the RAM 74 is rewritten, whereby it is possible to have a correction value best suited for each format.

For example, when the input signal is a video signal, real-time operation can be carried out by transferring data stored in the ROM 78 to the RAM 74 in a vertical retrace period.

With this configuration, for example, when the difference values in the area of 3×5 pixels are smaller than the maximum value of the difference values in the area of 15×15 pixels around the notice pixel, smoothing the minute changes near the edges are intensified by increasing 14 filter coefficients other than that of the notice pixel, whereby mosquito noise can be reduced.

Furthermore, when the difference values in the area of 3×5 pixels are larger than the maximum value of the difference values in the area of 15×15 pixels, smoothing is weakened by decreasing the 14 filter coefficients other than that of the notice pixel, whereby mosquito noise reduction can be attained while retaining the edges.

Still further, in order to carry out processing around the notice pixel, the adaptive filtering is carried out in the area of 3×5 pixels, for example, regardless of the information at the time of compression, such as DCT blocks, whereby a highly effective filtering effect can be attained by one attempt and the hardware is made simple.

Figure 8:
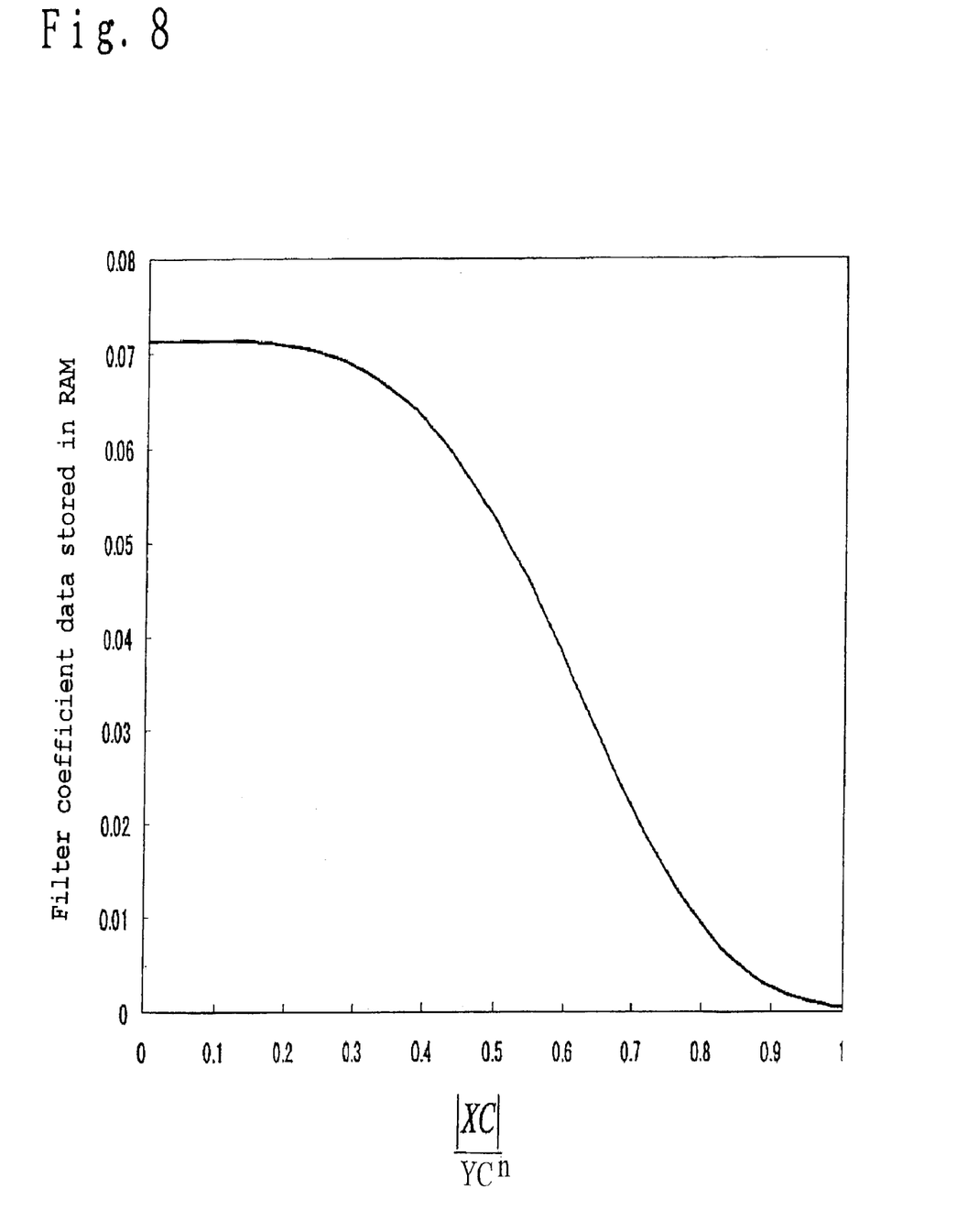
FIG. 8 is a view showing a graph for illustrating examples of data stored in RAM shown in FIG. 6.

When 8-bit data, that is, 256-level data, is used, and when the maximum value of the difference values in the area of 15×15 is assumed to be YC and the typical value of the difference values between the notice pixel and pixels other than the notice pixel in the area of 3×5 is assumed to be XC, it is desirable that the data to be set in the RAM 74 decreases monotonously in accordance with (Equation 4) as shown in FIG. 8, for example, and it is also desirable that the data is calculated by the following (Equation 5).

$$\frac{|XC|}{YC^n} \quad 1 \leq n \leq 2 \quad \text{(Equation 4)}$$

$$\exp\left[-A \cdot \left(\frac{|XC|}{YC^n}\right)^\gamma\right] \cdot S \quad \begin{array}{l} A > 0 \\ 2 \leq \gamma \leq 8 \quad 0 < S \leq \frac{1}{(J \times K) - 1} \\ 1 \leq n \leq 2 \end{array} \quad \text{(Equation 5)}$$

All the data to be set in the RAM may have the same values, for example; the values may be different in the horizontal, vertical and slanting directions from the notice pixel; and the values may be different depending on the distance from the notice pixel; besides, the values are not limited to these.

In this embodiment, the line memory device 51 and the line memory device 55 are indicated independently; however, these may be united, whereby 15 line signals may be output to the difference value calculator 52 and three line signals may be output to the adaptive filtering device 54.

Furthermore, an example wherein the luminance signal is used as the video signal input is described; however, a color difference signal may be used as the input signal, the luminance signal may be used as the input of the line memory device 51, and the color difference signal at the same position of the luminance signal may be used as the input of the line memory device 55; however, the input signals are not limited to these.

Moreover, examples wherein M and N are 15, J is 3 and K is 5 3 are described; however, their values are not limited to these. Furthermore, the controller 79 is explained by taking the configuration for carrying out control depending on the result of the format detector 77 as an example; however, for example, the controller may be configured so as to carrying out control depending on the noise level of the input video; but the configurations are not limited to these.

Furthermore, in this embodiment, an example wherein the maximum value of the absolute values of the difference values of the luminance values-among the adjacent pixels is used as the predetermined gradient of the present invention is described; however, the gradient is not limited to this. The above-mentioned predetermined gradient may be the second largest value in the absolute values of the difference values of the luminance values among the adjacent pixels, for example; or a plurality of values may be selected in the decreasing order of the absolute values of the difference values of the luminance values among the adjacent pixels, beginning from the maximum value, and the average value of the values may be obtained, but the gradient is not limited to this.

In the above-mentioned embodiment, the case wherein the notice pixel addition process (step S9) is carried out for all pixels is described; however, the embodiment is not limited to this; for example, the notice pixel addition process (step S9) may be carried out only when the absolute value of the difference value XAk (k=1, 2, . . . , 8) is smaller than the above-mentioned predetermined gradient (for example, YA), in other words, only when the evaluation value is the threshold value TA1 or TA2 or less referring to FIG. 2, and the notice pixel addition process may not be carried out in other cases.

Furthermore, the present invention is a program that carries out the functions of all or part of the means (or apparatuses, devices, circuits, portions, etc.) of the above-mentioned noise reduction apparatus of the present invention by using a computer and operates in cooperation with the computer.

Still further, the present invention is a program that carries out the operations of all or part of the steps (or processes, operations, actions, etc.) of the above-mentioned noise reduction method of the present invention by using a computer and operates in cooperation with the computer.

Still further, the present invention is a medium that holds a program and/or data for carrying out all or part of the operations of all or part of the steps of the above-mentioned noise reduction method of the present invention, the medium can be read by a computer, and the above-mentioned program and/or data having been read carry out the above-mentioned operations in cooperation with the computer.

Still further, the present invention is a medium that holds a program and/or data for carrying out all or part of the functions of all or part of the means of the above-mentioned noise reduction apparatus of the present invention, the medium can be read by a computer, and the above-mentioned program and/or data having been read carry out the above-mentioned functions in cooperation with the computer.

Part of the means (or apparatuses, devices, circuits, portions, etc.) of the present invention and part of the steps (or processes, operations, actions, etc.) of the present invention designate some means or steps in the plural means or steps, or part of functions or part of actions in one means or step.

In addition, a recording medium on which the program of the present invention has been recorded and which is readable by a computer is also included in the present invention.

Furthermore, a utilization form of the program of the present invention may be an embodiment that is recorded on a recording medium readable by a computer and operates in cooperation with the computer.

Still further, a utilization form of the program of the present invention may be an embodiment that is transmitted through a transmission medium and read by a computer and operates in cooperation with the computer.

Still further, the data structure of the present invention includes a database, a data format, a data table, a data list, a data type, etc.

Still further, the recording medium includes ROM, etc., and the transmission medium includes a transmission medium, such as the Internet, light, electric wave, sound wave, etc.

Still further, the above-mentioned computer of the present invention is not limited to pure hardware, such as a CPU, but may include firmware, an OS and peripheral devices.

Still further, as described above, the configuration of the present invention may be attained by software or by hardware.

Industrial Applicability

As described above, the present invention has an effect of reducing mosquito noise while retaining edges by using simple hardware without using information at the time of compression, such as DCT blocks.

The invention claimed is:

1. A noise reduction method for the decoded signal of a digitally compressed image signal, comprising:
   a gradient calculation step of obtaining a predetermined gradient in an area of vertical M×horizontal N pixels (M and N are positive integers) around a notice pixel,
   a difference value calculation step of calculating, in an area of vertical J×horizontal K pixels (J and K are positive integers satisfying the relationships of J≦M and K≦N, respectively) around said notice pixel, (J×K−1) difference values between said notice pixel and pixels other than said notice pixel,
   a correction value calculation step of calculating correction values from said gradient obtained by said gradient calculation step and said (J×K−1) difference values obtained by said difference value calculation step, and
   an addition step of calculating a new notice pixel by adding said correction values to said notice pixel.

2. A noise reduction method in accordance with claim 1, wherein said correction value calculation step is a step of calculating (J×K−1) correction values corresponding to the (J×K−1) pixels other than said notice pixel, respectively.

3. A noise reduction method in accordance with claim 2, wherein said (J×K−1) correction values calculated at said correction value calculation step and corresponding to said (J×K−1) pixels other than said notice pixel are calculated so that,
   (a-1) each of said correction values becomes larger as each of said (J×K−1) difference values becomes larger until an evaluation value based on said predetermined gradient and said difference value exceeds a predetermined threshold value T, and (a-2) each of said correction values holds a constant value or becomes smaller than the constant value as each of said (J×K−1) difference values becomes larger and when said evaluation value exceeds said threshold value T, and so that
   (b-1) a sign of said correction value is positive when the pixel value of said notice pixel is larger than or equal to the corresponding (J×K−1) pixel values, and (b-2) the sign is negative when the pixel value of said notice pixel is smaller.

4. A noise reduction method in accordance with claim 2, wherein said correction value calculation step carries out calculation such that, when the absolute value of the result of the addition of all of said (J×K−1) correction values is larger than a predetermined value L, a correction value having the sign of which is the same as that of the result of the addition of all of said (J×K−1) values and the predetermined value L, is obtained, and when the absolute value is not more than the predetermined value L, the result of the addition of all of said (J×K−1) values is obtained as said correction value.

5. A noise reduction method in accordance with claim 1, wherein said predetermined gradient calculated by said gradient calculation step is the maximum value of the difference values of the adjacent pixels in said area of vertical M×horizontal N pixels.

6. A noise reduction method in accordance with claim 5, wherein as said maximum value of said difference values becomes larger, said correction values calculated by said correction value calculation step become larger.

7. A noise reduction apparatus for the decoded signal of a digitally compressed image signal, comprising:
   gradient calculation means of obtaining a predetermined gradient in an area of vertical M×horizontal N pixels (M and N are positive integers) around a notice pixel,
   difference value calculation means of calculating, in an area of vertical J×horizontal K pixels (J and K are positive integers satisfying the relationships of J≦M and K≦N, respectively) around said notice pixel, (J×K−1) difference values between said notice pixel and pixels other than said notice pixel,
   correction value calculation means of calculating correction values from said gradient obtained by said gradient calculation means and said (J×K−1) difference values obtained by said difference value calculation means, and
   addition means of calculating a new notice pixel by adding said correction values to said notice pixel.

8. A noise reduction apparatus in accordance with claim 7, wherein said correction value calculation means calculates (J×K−1) correction values corresponding to the (J×K−1) pixels other than said notice pixel, respectively.

9. A noise reduction apparatus in accordance with claim 8, wherein said (J×K−1) correction values calculated by said correction value calculation means and corresponding to said (J×K−1) pixels other than said notice pixel are calculated so that,
   (a-1) each of said correction values becomes larger as each of said (J×K−1) difference values becomes larger until an evaluation value based on said predetermined gradient and said difference value exceeds a predetermined threshold value T, and (a-2) each of said correction values holds a constant value or becomes smaller than the constant value as each of said (J×K−1) difference values becomes larger and when said evaluation value exceeds said threshold value T, and so that (b-1) a sign of said correction value is positive when the pixel value of said notice pixel is larger than or equal to the corresponding (J×K−1) pixel values, and (b-2) the sign is negative when the pixel value of said notice pixel is smaller.

10. A noise reduction apparatus in accordance with claim 8, wherein said correction value calculation means carries out calculation such that, when the absolute value of the result of the addition of all of said (J×K−1) correction values is larger than a predetermined value L, the correction value having the sign of which is the same as that of the result of the addition of all of said (J×K−1) values and the predetermined value L, is obtained, and when the absolute value is not more than the predetermined value L, the result of the addition of all of said (J×K−1) values is obtained as said correction value.

11. A noise reduction apparatus in accordance with claim 8, wherein said (J×K−1) correction values are read from (J×K−1) memory devices, respectively.

12. A noise reduction apparatus in accordance with claim 11, wherein contents to be held in said memory devices are rewritable depending on inputs.

13. A noise reduction apparatus for the decoded signal of a digitally compressed image signal, comprising:

gradient calculation means of obtaining a predetermined gradient in an area of vertical M×horizontal N pixels (M and N are positive integers) around a notice pixel, difference value calculation means of calculating, in an area of vertical J×horizontal K pixels (J and K are positive integers satisfying the relationships of $J \leq M$ and $K \leq N$, respectively) around said notice pixel, (J×K−1) difference values between said notice pixel and pixels other than said notice pixel, filter coefficient calculation means of calculating filter coefficient from said gradient obtained by said gradient calculation means and said (J×K−1) difference values obtained by said difference value calculation means, and filtering means of carrying out filtering on the basis of said calculated filter coefficients.

14. A noise reduction apparatus in accordance with claim 13, wherein said filter coefficient calculation means calculates (J×K−1) filter coefficients corresponding to the (J×K−1) pixels other than said notice pixel, respectively.

15. A noise reduction apparatus in accordance with claim 14, wherein said (J×K−1) filter coefficients calculated by said filter coefficient calculation means and corresponding to said (J×K−1) pixels other than said notice pixel are obtained by carrying out predetermined calculations from the candidates of filter coefficients, (a-1) each of which holds a constant value or becomes larger as the gradient in said area of M×N becomes larger, and (a-2) each of which holds a constant value or becomes smaller as each of said (J×K−1) difference values becomes larger, and (b) the filter coefficient of said notice pixel is determined so that the sum of the filter coefficient of said notice pixel and said (J×K−1) filter coefficients of said pixels other than said notice pixel becomes one.

16. A noise reduction apparatus in accordance with claim 15, wherein said predetermined calculation is a calculation for carrying out classification depending on the distances of the pixels corresponding to said filter coefficient candidates from said notice pixel and for carrying out correction so that the filter coefficients of pixels away from said notice pixel become smaller than any filter coefficients of pixels near said notice pixel.

17. A noise reduction apparatus in accordance with claim 14, wherein said (J×K−1) filter coefficients are read from (J×K−1) memory devices, respectively.

18. A noise reduction apparatus in accordance with claim 17, wherein contents to be held in said memory devices are rewritable depending on inputs.

19. A computer-readable medium holding an instruction and/or data for carrying out the operations of the steps of said noise reduction method in accordance with any one of claims 1 to 6 by using a computer and being processable by the computer.

20. A computer-readable medium holding an instruction and/or data for carrying out the functions of the means of said noise reduction apparatus in accordance with any one of claims 7 to 18 by using a computer and being processable by the computer.

21. A computer implemented instruction for causing a computer to carry out said gradient calculation step, said difference value calculation step, said correction value calculation step and said addition step of said noise reduction apparatus in accordance with any one of claims 1 to 6.

22. A computer implemented instruction for activating a computer as said gradient calculation means, said difference value calculation means, said correction value calculation means and said addition means of said noise reduction apparatus in accordance with any one of claims 7 to 18.

* * * * *